United States Patent [19]
Franklin et al.

[11] Patent Number: 5,721,383
[45] Date of Patent: Feb. 24, 1998

[54] FLOW METER SYSTEM AND METHOD OF USING SAME

[75] Inventors: Mark Terrance Franklin, San Diego; John Elwood McGregor, III, Encinitas; Robert W. Beyer, Long Beach; Gerald Lucas, El Toro, all of Calif.

[73] Assignee: Water Savers, Inc., San Diego, Calif.

[21] Appl. No.: 839,672

[22] Filed: Apr. 15, 1997

Related U.S. Application Data

[63] Continuation of Ser. No. 560,161, Nov. 20, 1995, abandoned.

[51] Int. Cl.$^6$ .................................................. G01F 1/06
[52] U.S. Cl. .................................. 73/861.77; 73/861.79
[58] Field of Search ........................... 73/861.77, 861.78, 73/861.79, 861.65, 861.74

[56] References Cited

U.S. PATENT DOCUMENTS

| | | | |
|---|---|---|---|
| 3,792,610 | 2/1974 | Kountanis et al. | 73/861.77 |
| 4,024,762 | 5/1977 | Roberts, Jr. | 73/861.74 |
| 4,590,805 | 5/1986 | Baird et al. | 73/861.77 |
| 4,656,873 | 4/1987 | Stewart | 73/861.79 |
| 4,936,151 | 6/1990 | Tokoi | 73/861.77 |
| 4,940,976 | 7/1990 | Gastouniotis et al. | 73/861.77 |
| 5,282,389 | 2/1994 | Faivre et al. | 73/861.74 |

OTHER PUBLICATIONS

"Digi–Flo F–900 Digital Electronic Flow Sensor", Blue–White Industries (Oct. 1994).
Blue–White Catalog, Blue–White, pp. 17–20 (1995).

*Primary Examiner*—George M. Dombroske
*Assistant Examiner*—Harshad Patel
*Attorney, Agent, or Firm*—Bernard L. Kleinke; Peter P. Scott

[57] ABSTRACT

A flow meter system and method includes detecting the movement of a substance through a conduit with a sensing device partially within the path of flow of the substance. A signal indicative of the quantity of the substance moving through the conduit is generated in response to the detection of the movement of the substance. Another signal indicative of the cumulative quantity of the substance is generated from the quantity signal. Cumulative quantity information is transmitted in a wireless manner, and is received at a remote location.

7 Claims, 3 Drawing Sheets

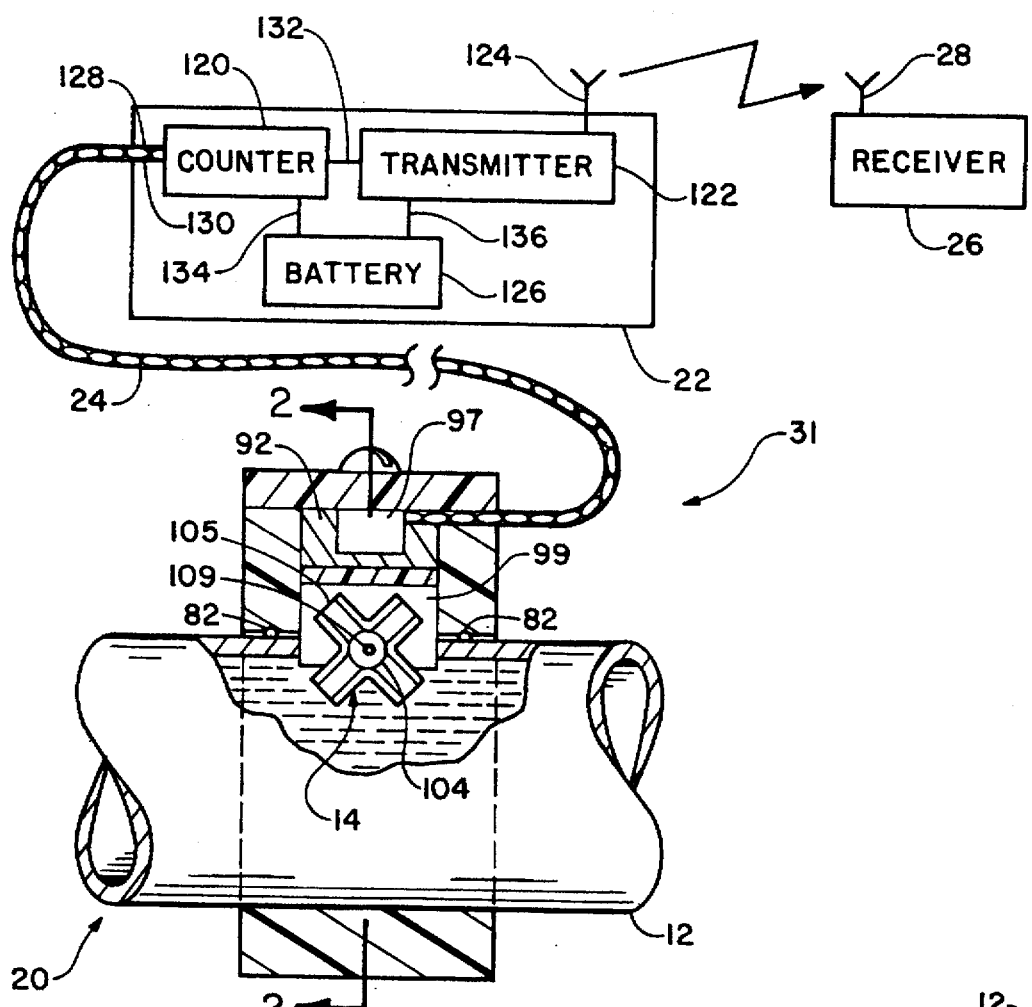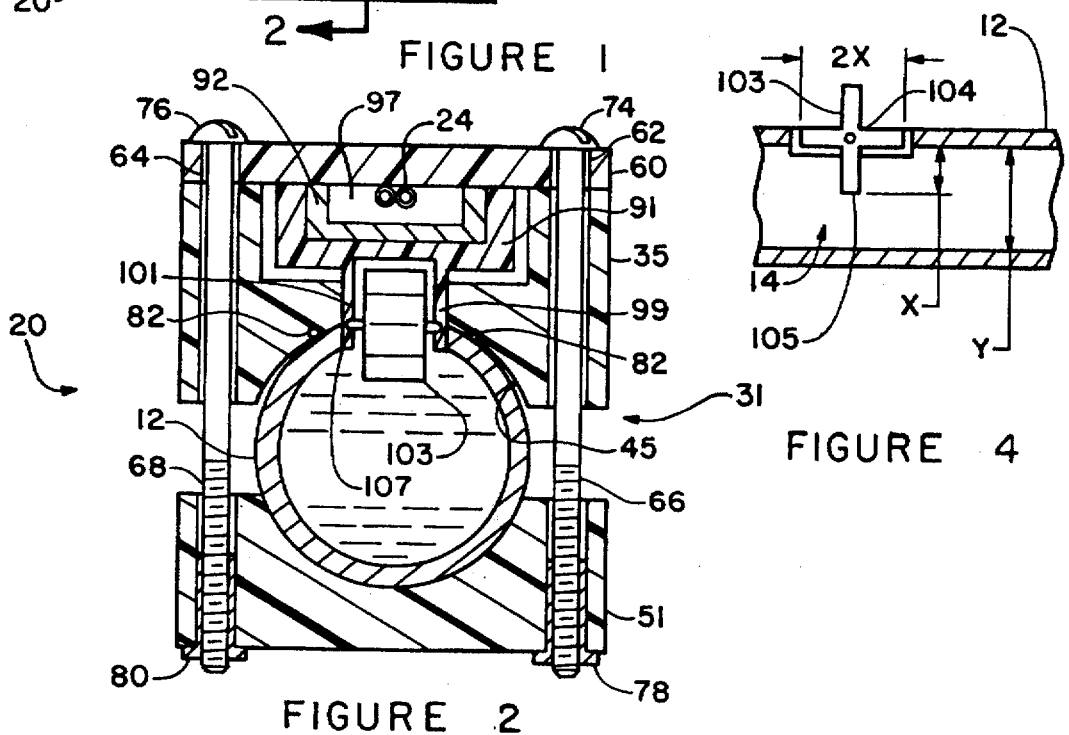

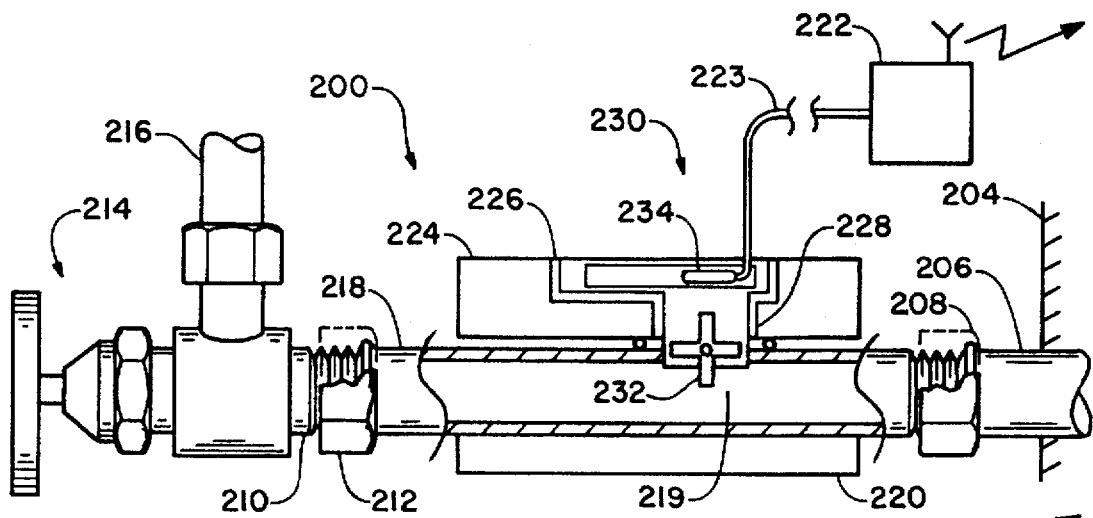
FIGURE 5
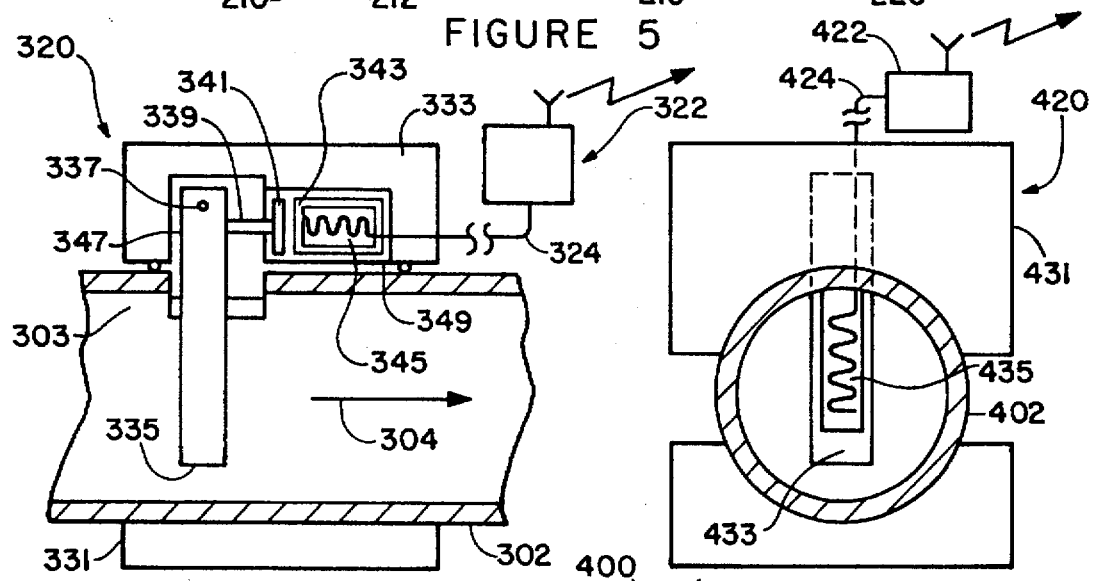
FIGURE 6
FIGURE 7
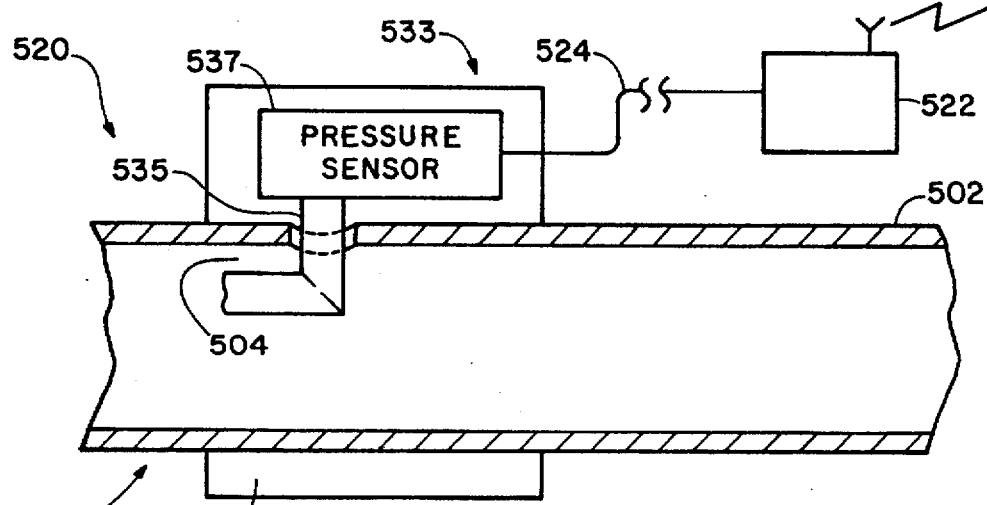
FIGURE 8

FLOW METER SYSTEM AND METHOD OF USING SAME

This application is a continuation of application Ser. No. 08/560,161, filed Nov. 20, 1995, now abandoned.

TECHNICAL FIELD

The present invention relates in general to an improved flow meter system and a method of using it. The invention more particularly relates to a flow meter system for measuring the quantity of substances, such as liquids and gases, and in the preferred form of the invention, the quantity of water flowing in a pipe, according to a novel method.

BACKGROUND ART

There have been many types of flow meter systems, such as flow meters for measuring the flow of water through a pipe to monitor water consumption. Conventional flow meters have been useful for determining the amount of water delivered by a local water service to a single user to enable the water service to receive payment from the user for the amount of water actually delivered. The single user may have a relatively small requirement for water, such as a single family residence, or the single user may have a relatively large requirement for water, such as a multi-family residence or a commercial building. In either case, the water service has been provided with information regarding the total amount of water delivered to the single user by utilizing the flow meter. For example, reference may be made to the following U.S. patents, the disclosures therein being incorporated by reference: U.S. Pat. Nos. 4,015,366; 4,107,988; 4,324,135; 4,399,695; 4,654,147; 4,830,511; 4,860,923; 4,886,190; 4,889,148; 4,901,886; 5,056,554; 5,287,884; 5,381,926; and 5,435,188.

Thus, a flow meter installed in-line is well known for determining the total amount of water delivered. The flow meter is installed so that it can be readily viewed by representatives from the water service, and is generally located outside of the structure which is receiving the water. Indicators, such as mechanical dials, were disposed on the housing for providing a viewable display of the water flow measurement.

A measuring chamber within the meter housing, connected in fluid communication with the water supply pipe, permitted the water to pass therethrough. The flow rate of the water through the measuring chamber was proportional to the flow rate of the water through the pipe. Thus, by measuring the flow of the water through the measuring chamber, it is possible to determine the quantity of the water delivered through the pipe for customer billing purposes.

An impeller disposed within the measuring chamber is coupled mechanically to the indicators, and is rotated within the measuring chamber as water flows therethrough. The amount of rotation of the impeller is indicative of the amount of water flowing past the impeller in the measuring chamber. The impeller was positioned centrally within the measuring chamber to ensure the symmetrical distribution of the water across the impeller. Thus, the force imparted by the water flowing through the measuring chamber is applied across the impeller in a substantially uniform manner to provide a representative measurement of the amount of water that passed through the measuring chamber.

Although such a flow meter may adequately measure the flow rate of water delivered for some applications, the flow meter was relatively expensive to manufacture. The manufacturing expense is determined, in part, by the requirement to design the housing specially to compensate for the irregularities in the water flow caused by the impeller itself, since it is positioned within the flow path of the water, and thus disturbs the water flow. Hence, to secure more accurately the water flow, the meter housing and chamber must be constructed under close tolerances to compensate precisely for the intrusion of the impeller.

In addition to being relatively expensive, the known water flow meters have been relatively difficult and time consuming to install on existing water pipes. Before some conventional flow meters can be installed, an appropriate section of pipe has been removed to enable the water meter to be connected in-line with the pipe. Thus, the installation was also time consuming as well as being burdensome and awkward.

The installation of the known water meter was further complicated where the meter is required to be installed in an area with little clearance around the pipe. The relatively large size of the meter prevented it from being readily placed in confined areas. Thus, conventional meters must be installed in areas which were easily accessed by an installer and the required installation tools.

Therefore, it would be highly desirable to have a new and improved flow meter system, which is relatively small and compact in size. Such a flow meter system should be relatively convenient to install and relatively inexpensive to manufacture.

Where the single user is a multi-family residence, commercial building, or another facility having a number of unrelated individually billed tenants, sub-metering has been employed to distinguish the amount of water delivered to each one of the tenants individually.

Due to the size and expense, the use of the known water flow meters described previously have been quite limited, or totally unacceptable for sub-metering purposes. In this regard, conventional meters have been limited to uses where each water pipe served only a single tenant occupied space. As only the one tenant was receiving water through that pipe, the measurement of the water flow through that water supply pipe could be accomplished with the prior water flow meters without taking up excessive space, or incurring an extraordinary expense.

However, it is a more common situation to have a number of tenant occupied units each supplied by a plurality of water supply lines, and merely one supply line per unit. In such situations, metering a group of water supply pipes for each unit requires one water meter for each water supply line for each tenant occupied unit. Thus, the cost of the meters, as well as the expense of the installation of the meters, becomes quite prohibitive for sub-metering purposes in most applications.

Furthermore, the determination of how each tenant in each tenant occupied space utilizes water is impossible or at least not readily accomplished with the known water flow meters. For example, a typical one bedroom, one bath, residence apartment or condominium within a multi-family residence can be serviced with seven separate water pipes for delivering water: (1) a kitchen sink hot water supply; (2) a kitchen sink cold water supply; (3) a bathroom sink hot water supply; (4) a bathroom sink cold water supply; (5) a toilet cold water supply; (6) a shower hot water supply; and (7) a shower cold water supply.

Equipping all seven water supplies with conventional water flow meters would require seven of the bulky meters, one for each supply. The use of such meters would be awkward, especially in a bathroom where space is not readily available, if not exceedingly difficult. For example, the use of a known water flow meter for the toilet water supply would require the meter to be positioned in the vicinity of the toilet itself. Such a large, bulky meter would be unsightly, and totally inappropriate for most decor.

The use of conventional water flow meters for sub-metering purposes is especially burdensome when the meters are installed on existing water pipes. In this regard, all of the water supply pipes to be measured must be cut away to permit the in-line installation of the water flow meter. Where the pipe to be monitored is disposed within a wall, such as the hot and cold water pipes supplying a shower, it is impossible, or at least highly impractical to mount a large water meter in the wall.

Therefore, it would also be highly desirable to have a new and improved flow meter system which can be used to sub-meter water use in a convenient and practical manner, and which can facilitate the determination as to how each tenant is using the water supplied thereto for each water supply line for each unit, without unduly interfering with the free enjoyment of the space by the tenant. Such a flow meter system should be easily installed in an existing water piping system, and should be capable of being readily and conveniently monitored without interfering with the use and enjoyment of the residence space being monitored.

DISCLOSURE OF INVENTION

Therefore, the principal object of the present invention is to provide a new and improved flow meter system, and a method of using it, wherein the flow meter system is relatively small in size, is relatively easy to install and is relatively inexpensive to manufacture.

Another object of the present invention is to provide such a system and method capable of being used to sub-meter a residence complex in a readily installed manner in an existing water piping system.

Briefly, the above and further objects of the present invention are realized by providing a new and improved water flow meter which can be utilized according to a novel method of the present invention.

A flow meter system and method includes detecting the movement of a substance through a conduit with a sensing device partially within the path of flow of the substance. A signal indicative of the quantity of the substance moving through the conduit is generated in response to the detection of the movement of the substance. Another signal indicative of the cumulative quantity of the substance is generated from the quantity signal. Cumulative quantity information is transmitted in a wireless manner, and is received at a remote location.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a partially cut-away sectional diagrammatic side view of a flow meter system, which is constructed in accordance with the present invention;

FIG. 2 is a cross-sectional rear view of the flow meter system of FIG. 1 taken along line 2—2 thereof;

FIG. 4 is a sectional diagrammatical side view of the flow meter system of FIG. 1;

FIG. 5 is partially cut-away sectional diagrammatic side view of another flow meter system, which is also constructed in accordance with the present invention;

FIG. 6 is a sectional diagrammatic side view another flow meter system, which is also constructed in accordance with the present invention;

FIG. 7 is a sectional diagrammatic front view of yet another flow meter system, which is also constructed in accordance with the present invention; and FIG. 8 is a sectional diagrammatic side view of another flow meter system, which is also constructed in accordance with the present invention.

BEST MODE FOR CARRYING OUT THE INVENTION

Figure 3:
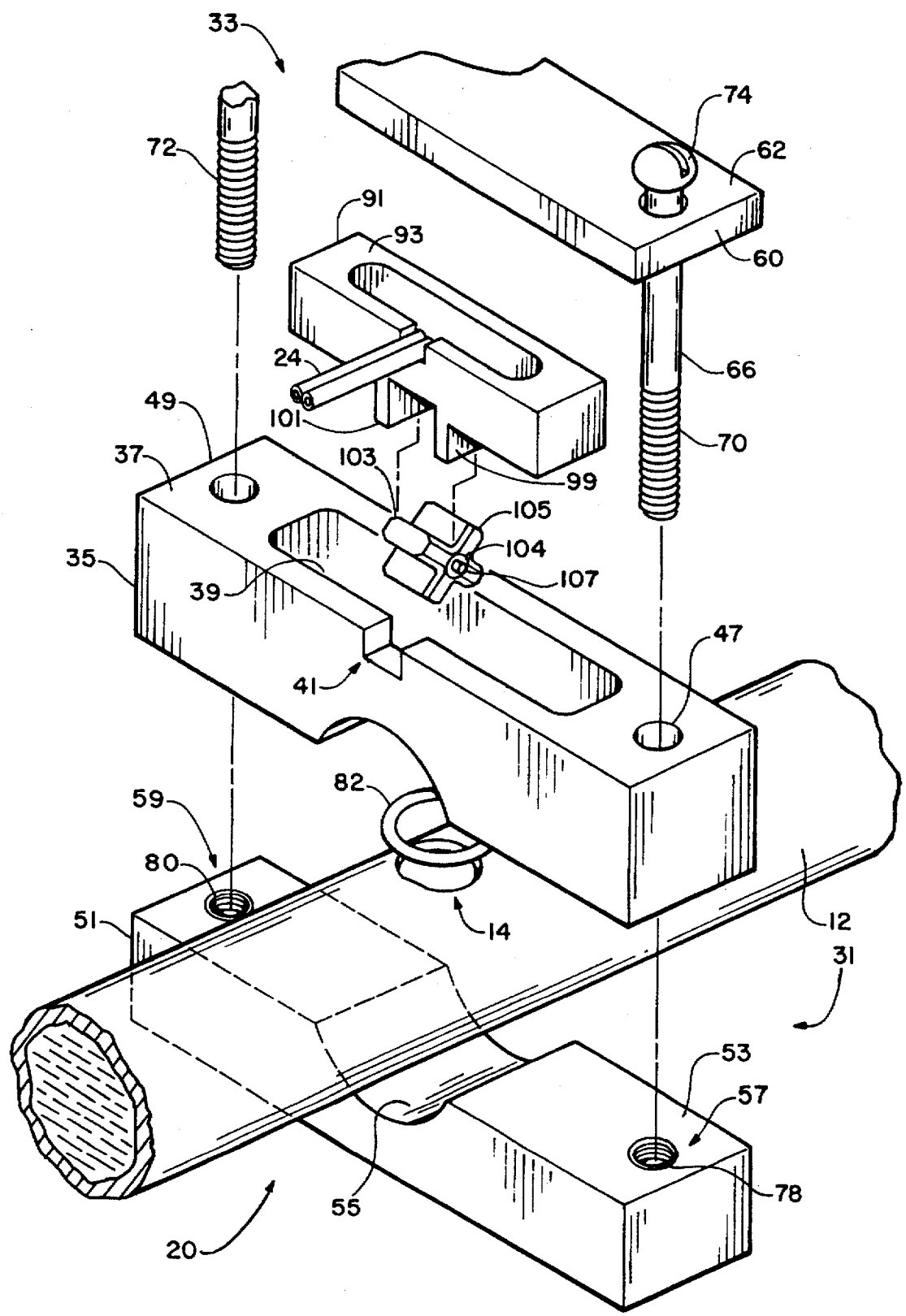
FIG. 3 is an exploded rear perspective view of the flow meter system of FIG. 1.

Referring now to the drawings, and more particularly to FIG. 1 thereof, there is shown a flow meter system 10, which is constructed in accordance with the present invention. The flow meter system 10 can be used to measure the quantity of a substance moving through a conduit or pipe 12 in accordance with the method of the present invention. Preferably, the flow meter system 10 is used to measure the quantity of water moving through the pipe 12.

The flow meter system 10 generally comprises a flow monitor 20 secured to the pipe 12 in a fluid tight manner. An opening 14 in the pipe 12 enables the flow monitor 20 to contact the water within the pipe 12. As the water flows through the pipe 12, the flow monitor 20 generates an electrical signal indicative of the quantity of water which has moved through the pipe 12 at about the opening 14 therein.

A wireless transmitter device 22 is connected to the flow monitor 20 by conductor 24 to receive the electrical signal generated by the flow monitor 20. The wireless transmitter device 22 enables the electrical signal to be transmitted as information indicative of the cumulative quantity of water moving through the pipe 12 to a remote location without the use of conductors. The wireless transmitter device 22 may be positioned as desired relative to the flow monitor 20. The only limitation to the positioning of the wireless transmitter device 22 being the length of the conductor 24.

For example, where the pipe 12 is located behind a wall, the flow monitor 20 will similarly be located behind the wall. To facilitate the transmission of the information from the wireless transmitter device 22, the wireless transmitter device 22 may be positioned in front of the wall in the vicinity of the flow monitor 20.

The flow meter system 10 further includes a receiver device 26 having an antenna 28 for receiving the information transmitted from the wireless transmitter device 22. The receiver device 26 may be positioned as desired, and preferably will be located in an easily accessible location to aid in the monitoring of the water flow. Such a receiver device is well known to those skilled in the art and will not be described hereinafter in greater detail.

In use, the desired location on the pipe 12 is determined for locating the flow monitor 20. An opening, such as opening 14, is produced in the pipe 12 at the desired location. Conventional tools, such as a drill, may be used to drill out the circular opening 14. The flow monitor 20 is secured to the pipe 12 at about the opening 14, wherein the opening 14 is enclosed by the flow monitor 20 in a fluid tight manner. The flow monitor 20 generates an electrical signal indicative of the quantity of water flowing through the pipe 12. The wireless transmitter device 22 receives the electrical signal from the flow monitor 20, and subsequently transmits information indicative of the cumulative quantity of water that has moved past the flow monitor 20. The receiver device 26 receives the information transmitted by the wireless transmitter device 22 thereby permitting the quantity of water flowing through the pipe 12 to be monitored from a remote location.

Considering now the construction of the flow monitor 20 in greater detail with reference to FIGS. 1-3, the flow monitor 20 includes a yoke 31 to engage the pipe 12 in a water tight manner. The yoke 31 includes an elongated rectangular yoke member 35 having a curved bottom surface 45 for engaging transversely the pipe at about the opening 14, wherein the curved bottom surface 45 is adapted to receive the outer surface of the pipe 12. A watertight gasket, such as sealing ring 82 whose diameter is slightly larger than the diameter of opening 14, is disposed between the pipe 12 and the curved bottom surface 45 surrounding the opening 14 to facilitate the watertight coupling of the flow monitor 20 to the pipe 12.

Another elongated rectangular yoke member 51 having a curved top surface 55 engages transversely the pipe 12 opposite the opening 14 and cooperates with the yoke member 35 to secure the yoke 31 on the pipe 12. Curved top surface 55 is adapted to receive the outer surface of the pipe 12, wherein surfaces 45 and 55 engage frictionally the pipe 12 to prevent the movement of the flow monitor 20 relative to the pipe 12.

Yoke members 35 and 51 are preferably constructed from engineering thermoplastic material in compliance with industry accepted standards. Alternatively, the yoke members 35 and 51 may be constructed from metal materials in compliance with industry standards, such as brass.

As will be understood by those skilled in the art, the labels of up, down, top and bottom in connection with the flow meter system 10 are relative only. In this regard, the opening 14 may be located at any position on the pipe 12, and the orientation of the flow monitor 20 adjusted accordingly. Thus, the opening 14 could be located on the bottom of the pipe 12. The watertight connection of the flow monitor to the pipe 12 prevents water leakage, even when water is not flowing but resting within the pipe 12.

A cover 60 having a pair of oppositely disposed holes 62 and 64 therein is sized to match substantially a top surface 37 of the yoke member 35, wherein a recess opening 39 through the top surface 37 and into the yoke member 35 is enclosed by the cover 60. The cover 60 is preferably constructed from a suitable metal according to industry standards, however, other acceptable materials may also be used.

A pair of bolts 66 and 68 having shaft portions 70 and 72, and head portions 74 and 76, respectively, pass through the openings 62 and 64, as well as openings 47 and 49 in the yoke member 35, to permit the shaft portions 70 and 72 to engage threaded retaining members 78 and 80 within openings 57 and 59 in the yoke member 51.

The head portions 74 and 76 have a larger diameter than the openings 62 and 64 to engage the cover 60 for permitting the yoke 31 to be tightened to secure it to the pipe 12. The bolts 66 and 68 may be rotated in one direction to cause the cover 60 and the yoke member 35 to be pressed inwardly on one side of the pipe 12, while simultaneously causing the other yoke member 51 to be urged inwardly towards the pipe on the side opposite from the opening 14.

The flow monitor 20 further includes a flow measuring device 33 disposed within the recessed opening 39, and which extends downwardly through a pathway 46 and the opening 14 to engage the water within the pipe 12. The flow measuring device 33 includes a rectangular housing 91 which is sized and dimensioned to be received within the recessed opening 39. A sealing material 92 disposed between the housing 91 and the yoke member 35 provides a watertight seal therebetween.

A pair of spaced apart walls 99 and 101 extend downwardly from the housing 91 through the pathway 46 to define a watertight compartment above the opening 14.

A paddle wheel 103 having a central hub 104 and blades, such as blade 105, extending radially therefrom is coupled rotatably between the walls 99 and 101 within the watertight compartment. In this regard, an axle 107 is received within the hub 104 and is supported by the walls 99 and 101 on either side of the paddle 103. As best seen in FIGS. 1 and 2, the paddle wheel 103 extends through the opening 14 and into the interior of the pipe 12 in a slightly intrusive manner to contact outermost layers of the water flowing therein, wherein the water flow is minimally disrupted. To permit the blades, such as blade 105, to extend fully into the pipe 12, the hub 104 is positioned at about the opening 14.

Disposed within the blade 105 is a magnet 109 for helping to generate the electrical signal indicative of the quantity of water moving through the pipe 12, as will be discussed hereinafter in greater detail. Although in the preferred embodiment only one blade, blade 105, of the paddle wheel 103 contains a magnet therein, the use of more than one magnet in a plurality of blades will produce a satisfactory indication of the water quantity flowing within the pipe 12.

As best seen in FIG. 4, the radial length X of the blades is a factor in the selection of the appropriate diameter of the opening 14 relative to the pipe diameter Y of the pipe 12. For example, typical water supply pipes for residential use generally have pipe diameters in a range between about ½ inch and about 2 inches. Where the opening diameter 2X is ⅜ inch for both ½ inch pipes and 2 inch pipes, the ratios of the maximum hole diameter to pipe diameter is ¾ and ³⁄₁₆, respectively. Thus, the minimum hole diameter may be expressed as ³⁄₁₆×½ inch=³⁄₃₂ inch and the maximum hole diameter may be expressed as ¾×2 inches=³⁄₂ inches. Using the calculated minimum and maximum hole diameters ³⁄₃₂ inch and ³⁄₂ inches, the minimum and maximum penetration ratios X÷Y can be determined as follows:

$$\text{minimum penetration ratio}=(\tfrac{3}{8}"\div 2)/2=\tfrac{3}{32}=X\div Y$$

$$\text{maximum penetration ratio}=(\tfrac{3}{8}"\div 2)/\tfrac{1}{2}=\tfrac{3}{8}=X\div Y$$

As shown in FIG. 4, 2X is about equal to the diameter of the cross hole 14, where X is the radial length of the blades. Also, the penetration ratio can be expressed in the range of a minimum and a maximum. In this regard, the minimum such ratio is equal to X÷Y=³⁄₂ for 2 inch pipes, and the maximum ratio is X÷½ for ½ inch pipes.

Therefore, the radial length X of the blades can be determined from the penetration ratios set forth above, given the pipe diameter Y.

A magnetically activated reed relay switch 97 is disposed within the housing 91 adjacent to the paddle wheel 103 to generate the electrical signal indicative of the quantity of water flowing through the pipe 12. In this regard, as the water flows through the pipe 12, it rotates the paddle wheel 103 about the axle 107. The blade 105 is thus periodically positioned adjacent to the switch 97 to cause it to generate an electrical pulse. As the blade 105 rotates away from the switch 97, the switch 97 is no longer activated and the electrical pulse is terminated. The continued flow of water generates a train of pulses in this manner, wherein the number of pulses is proportioned to the quantity of water flowing within the pipe 12.

The electrical pulses are conducted by conductor 24 to the wireless transmitter device 22, wherein the conductor 24 exits the yoke 31 through a notch 41 in the yoke member 35.

Considering now the construction of the wireless transmitter device 22 in greater detail with reference to FIG. 1, the wireless transmitter device 22 includes a counter 120 connected to the conductor 24 by wires 128 and 130. The counter 120 receives the electrical pulses generated by the switch 97 for generating another electrical signal representative of the number of electrical pulses received from the switch 97 to facilitate the measurement of the cumulative water quantity flowing through the pipe 12. A transmitter 122 having an antenna 124 is connected to the counter 120 by a conductor 132 to facilitate the wireless transmission of information indicative of the cumulative water quantity to a remote location. The transmitter 122 may utilize radio frequency transmission, infrared transmission, or other methods known to those skilled in the art.

To facilitate the sustained operation of the wireless transmitter device 22, the device 22 further includes a photo voltaic battery cell 126 coupled to the counter 120 and the transmitter 122 by conductors 134 and 136, respectively. The use of the photo voltaic battery cell 126 reduces the maintenance required for continued operation of the flow meter system 10 as the cell 126 can be maintained in a charged state sufficient to operate the flow meter system 10 by being exposed periodically to ambient light.

Referring now to the drawings, and more particularly to FIG. 5 thereof, there is shown another flow meter system 200, which is also constructed in accordance with the present invention. The flow meter system 200 is substantially similar to the flow meter system 10, and is particularly suited for use in situations wherein a water supply pipe 206 extends from a wall 204 to connect with a water shutoff valve 214. For example, pipe 206 may provide the water supply for a toilet (not shown).

In this regard, the pipe 206 is generally connected to a pipe 210 of shutoff valve 214 with a threaded coupler 212. The shutoff valve 214 controls the flow of water from the pipe 206 through the valve and into the toilet through a pipe 216. However, the length of the pipe 206 and pipe 210 are generally not sufficient to permit a meter to be secured thereto.

To adapt to this situation, the flow meter system 200 includes a pipe 218 which is sized to substantially match the diameters of the pipes 206 and 210. The pipe 218 includes a threaded coupler 208 at one end thereof to facilitate the installation of the flow meter system 200 between the pipes 206 and 210.

The flow meter system 200 further includes a flow monitor 220 secured to the pipe 218 for generating an electrical signal indicative of the quantity of water flowing within the pipe 218. A wireless transmitter device 222 is coupled to the flow monitor 220 by conductor 223. As wireless transmitter device 222 is substantially similar to the wireless transmitter device 22 of FIG. 1, it will not be discussed hereinafter in greater detail. The wireless transmitter device 222 transmits information to a remotely located receiver device (not shown) for enabling the quantity of water flowing in pipe 218 to be monitored remotely.

Considering now the flow monitor 220 in greater detail, the flow monitor 220 includes a flow measuring device 230 disposed within a cylindrical housing 224 surrounding the pipe 218. The flow measuring device 230 includes a paddle wheel 232 which is substantially similar to the paddle wheel 103, and which extends into an opening 219 of the pipe 218 to contact the water flowing therein.

A magnetically activated reed relay switch 234 is disposed adjacent to the paddle wheel 232 to generate the electrical signal indicative of the water flow.

Referring now to FIG. 6, there is shown another flow meter system 300 which is also constructed in accordance with the present invention. The flow meter system 300 includes a flow monitor 320 for generating an electrical signal indicative of the quantity of water flowing within a pipe 302, wherein the water is flowing left to right as indicated by the arrow 304. A wireless transmitter device 322, which is substantially similar to the wireless transmitter device 22 (FIG. 1), is connected to the flow monitor 320 by conductor 324 to receive and transmit the electrical signal to a remotely located receiver device (not shown).

The flow monitor 320 includes a flow measuring device 333 disposed within a yoke 331, and includes an elongated strip member extending through an opening 303 in the pipe 302 to contact the water therein. The strip 335 is pivotally connected at its upper end at a pivot hinge 337, and includes an arm 339 extending from the strip 335, wherein the water flowing within the pipe 302 causes the strip 335 to pivot about the hinge 337 and move the arm 339. A block 341 connected to the arm 339 engages a block 343 to impress a force thereon which is proportional to the quantity of water flowing through the pipe 302.

A strain gauge 345 secured to the block 343 generates the electrical signal indicative of the water quantity in response to the strip 335 imparting the force onto the block 343.

Referring now to FIG. 7, there is shown another water flow meter system 400, which is also constructed in accordance with the present invention. The flow meter system 400 is substantially similar to the flow meter system 300, and includes a flow monitor 420 secured to a pipe 402 for generating an electrical signal indicative of the quantity of water flowing within the pipe 402. A wireless transmitter device 422 is coupled to the flow monitor 420 by a conductor 424, and is substantially similar to the wireless transmitter device 22 (FIG. 1).

The flow monitor 420 includes a flexible elongated metal strip 433 secured at one end and extending into a pipe 402 through an opening (not shown) to contact the water flowing within the pipe 402. Secured to the strip 433 is a strain gauge 435 to generate the electrical signal proportional to the quantity of water flowing within the pipe 402. In this regard, the strip 433 is deflected or bent when contacted by water flowing within the pipe 402.

Referring now to FIG. 8, there is shown another flow meter system 500, which is also constructed in accordance with the present invention. The flow meter system 500 is substantially similar to the flow meter systems 10, 200, 300 and 400, described previously, and includes a flow monitor 520 connected to a wireless transmitter device 522 by a conductor 524. In this regard, the flow monitor 520 generates an electrical signal indicative of the quantity of water flowing within the pipe 502. The electrical signal is transmitted by the conductor 524 to the wireless transmitter device 522 for transmission to a remote location.

Considering now the flow monitor 520 in greater detail, the flow monitor 520 includes a pitot tube 535 extending through an opening 504 into the pipe to contact the water therein. A pressure sensor device 537 is coupled to the pitot tube 535 to generate the electrical signal wherein the electrical signal is indicative of the quantity of water flowing within the pipe 502.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A sub-metering flow meter system for measuring the quantity of a fluid moving through a conduit to a toilet, the conduit having an opening therein, comprising:

a shut off valve connected in fluid communication with the conduit to control the flow of fluid to the toilet;

sensing means for mounting to the conduit adjacent to the shut off valve and extending only partially through the opening into the path of flow of the fluid for detecting movement of the fluid through the conduit to the toilet to generate a quantity signal indicative of the quantity of the fluid moving therepast;

counter means responsive to said quantity signal for generating a cumulative quantity signal indicative of a cumulative quantity of fluid moving past said sensing means;

communication means responsive to the cumulative quantity signal for transmitting cumulative quantity information;

receiver means positioned remotely from said communication means for receiving said cumulative quantity information at a remote location;

said sensing means including a housing means being mounted substantially entirely outside of said conduit and enclosing substantially the conduit opening for securing said sensing means to the conduit in a fluid tight manner, said sensing means further including a revolvable paddle wheel disposed within said housing means and extending partially through the opening for contacting the fluid to facilitate the generation of said quantity signal, and said sensing means further including a signal generating means disposed within said housing means for cooperating with said paddle wheel to generate said quantity signal for quantifying the amount of the fluid moving through the conduit;

said signal generating means including a magnetically activated switch for generating electrical pulses;

said revolvable paddle wheel having a plurality of blades extending radially from a hub, at least one of said blades including a magnet disposed therein for cooperating with said magnetically activated switch to produce a series of said electrical pulses defining said cumulative quantity signal when said paddle wheel is rotated by the fluid moving thereby, wherein the radial length X of the blades is dimensioned relative to the diameter Y of the conduit;

said housing means including support means therewithin for enabling said paddle wheel to extend partially through the conduit opening in a slightly intrusive manner to contact the fluid, wherein said hub is positioned at approximately the opening to permit said blades to extend through the opening and into, the conduit to greatly reduce disruption of the flow of the fluid; and wherein the minimum penetration ratio of the relative dimensions of the conduit opening and the blades is equal to the radial length X of the paddle wheel blades divided by the diameter Y of the conduit, and the maximum penetration ratio being equal to the radial length X divided by the diameter Y of the conduit to enable the blades to penetrate the fluid flowing within the interior of the conduit in a slightly intrusive manner to contact outermost layers of the flowing fluid to disrupt the flow thereof minimally, wherein said minimum penetration ratio is approximately $3/32$ and said maximum penetration ratio is approximately $3/8$;

wherein the diameter of the conduit opening is substantially equal to twice the radial length of the paddle wheel blades;

whereby accurate measurements of flow to the toilet are facilitated.

2. A sub-metering flow meter system according to claim 1, wherein said housing means further includes a yoke having an opening therethrough and another yoke coupled releasably to one another for facilitating the fluid tight engagement of said housing means with the conduit on opposite sides thereof, said support means being received within the yoke opening, and said support means including a pair of spaced apart walls extending into the conduit opening to define a chamber to receive and to support rotatably said paddle wheel therein.

3. A sub-metering flow meter system according to claim 2, wherein said cumulative quantity signal generated by said counter means is indicative of the number of said electrical pulses produced by said magnetically activated switch.

4. A sub-metering flow meter system according to claim 3, wherein said communication means includes a transmitter means coupled to said counter means for transmitting said information to said receiving means.

5. A sub-metering flow meter system according to claim 4, wherein said communications means further includes a photovoltaic cell coupled to said counter means and said transmitter means.

6. A sub-metering flow meter according to claim 2, further including securing means for releasably coupling said yoke and said another yoke to one another for enabling said sensing means to be mounted to said conduit.

7. A method for measuring the quantity of a fluid moving through a conduit to a toilet, the conduit having an opening therein, comprising:

connecting said conduit in fluid communication with a shut off valve to control the flow of fluid to the toilet;

using a sensing means for mounting to the conduit adjacent to the shut off valve and including a paddle wheel having a plurality of blades radiating outwardly from a hub, and further including support means for rotatably supporting said paddle wheel;

detecting movement of the fluid through the conduit and generating in response thereto, a quantity signal indicative of the quantity of the fluid moving therepast to determine water usage by the toilet;

generating a cumulative quantity signal indicative of the cumulative quantity of the fluid moving therepast;

transmitting cumulative quantity information in response to said cumulative quantity signal;

receiving said cumulative quantity information at a remote location;

positioning said support means outside of the conduit over the opening therein to enable said paddle wheel to extend partially through the opening in a slightly intrusive manner to contact the fluid with minimal disruption of the flow of the substance;

positioning said hub at approximately the opening; and dimensioning the radial length of the blades relative to the diameter of the conduit to provide a minimum penetration ratio of the relative dimensions of the conduit opening and the blades, said minimum ratio being equal to the radial length X of the paddle wheel blades divided by the diameter Y of the conduit, and to provide a maximum penetration ratio equal to the radial length X divided by the diameter Y of the conduit to enable the blades to penetrate the fluid flowing within the interior of the conduit in a slightly intrusive manner to contact outermost layers of the flowing fluid to disrupt the flow thereof minimally, wherein said minimum penetration ratio is approximately 3/32 and said maximum penetration ratio is approximately 3/8;

wherein the diameter of the conduit opening is substantially equal to twice the radial length of the paddle wheel blades; whereby accurate measurements of flow to the toilet are facilitated.

* * * * *